US012743526B2

(12) United States Patent
Xiao et al.

(10) Patent No.: US 12,743,526 B2
(45) Date of Patent: Sep. 22, 2026

(54) AUTOMATED LLM DATA LEAKAGE DETECTION VIA PERSUASIVE PROMPTING

(71) Applicant: Palo Alto Networks, Inc., Santa Clara, CA (US)

(72) Inventors: Feng Xiao, San Jose, CA (US); Yang Ji, San Jose, CA (US); Wenjun Hu, Santa Clara, CA (US); Danny Tsechansky, Kirkland, WA (US); Ali Islam, Fremont, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 0 days.

(21) Appl. No.: 18/902,396

(22) Filed: Sep. 30, 2024

(65) Prior Publication Data

US 2026/0093819 A1 Apr. 2, 2026

(51) Int. Cl.
*G06F 21/57* (2013.01)
*G06F 21/60* (2013.01)

(52) U.S. Cl.
CPC .......... *G06F 21/577* (2013.01); *G06F 21/604* (2013.01); *G06F 2221/033* (2013.01)

(58) Field of Classification Search
None
See application file for complete search history.

(56) References Cited

U.S. PATENT DOCUMENTS 12,468,846 B2 * 11/2025 Joshi .................. G06F 21/6245
2024/0330165 A1 * 10/2024 Pryzant .................. G06F 40/30
2024/0419804 A1 * 12/2024 Das ...................... G06F 21/577
2025/0094777 A1 * 3/2025 Yakovlev ............ G06N 3/0455
2025/0159014 A1 * 5/2025 Palanki ................ H04L 9/3239
2025/0165618 A1 * 5/2025 Cameron ............. G06F 21/552
2025/0217393 A1 * 7/2025 Rank ...................... G06F 40/35

(Continued)

OTHER PUBLICATIONS

Dong, et al., "Building Guardrails for Large Language Models", arXiv:2402.01822v1 [cs.CL] Feb. 2, 2024, 18 pages.

(Continued)

*Primary Examiner* — Boris D Grijalva Lobos
(74) *Attorney, Agent, or Firm* — Gilliam IP PLLC

(57) ABSTRACT

Assessments of guardrails of LLMs, whether used by an application or within an AI/LM stack, must be dynamic to protect against the ongoing engineering of jailbreaking prompts. An assessment framework has been created that facilitates assessment of language model guardrails. The assessment framework includes a prompt generator and has access to sensitive data (e.g., source code, trade secret, confidential documents, etc.) that occurs in training data of a model being assessed. The framework provides the prompt generator jailbreaking strategies and categories of the sensitive data (e.g., program code, trade secret, confidential document.). With the data categories and the strategies, the prompt generator generates different prompts and submits them to the AI-powered application or LM stack being assessed. The assessment framework then analyzes the outputs/responses from the AI-powered application or LM stack to determine whether guardrails have been subverted and any of the sensitive data has been exfiltrated.

20 Claims, 4 Drawing Sheets

(56) References Cited

U.S. PATENT DOCUMENTS

| | | | | |
|---|---|---|---|---|
| 2025/0335601 | A1* | 10/2025 | Fujita | G06F 21/577 |
| 2025/0348580 | A1* | 11/2025 | Galinkin | G06F 40/284 |

OTHER PUBLICATIONS

SHEN, et al., ""Do Anything Now": Characterizing and Evaluating In-The-Wild Jailbreak Prompts on Large Language Models", arXiv:2308.03825v2 [cs.CR] May 15, 2024, 22 pages
Shu, et al., "AttackEval: How to Evaluate the Effectiveness of Jailbreak Attacking on Large Language Models", arXiv:2401.09002v1 [cs.CL] Jan. 17, 2024, 30 pages.

* cited by examiner

AUTOMATED LLM DATA LEAKAGE DETECTION VIA PERSUASIVE PROMPTING

BACKGROUND

The disclosure generally relates to assessing vulnerability of language models (e.g., CPC class G06N and H04L 63).

For a prompt injection attack, a malicious actor disguises a malicious input within a legitimate prompt. For a jailbreaking prompt, a malicious actor creates a prompt that subverts the guardrails of a large language model (LLM). Malicious actors are creating and experimenting to engineer prompts for prompt injection attacks and jailbreaking prompts. Attacks within both classes of prompt-based attacks manipulate a LLM to elicit a response not intended by the owners of the LLM or an application using the LLM.

BRIEF DESCRIPTION OF THE DRAWINGS

Embodiments of the disclosure may be better understood by referencing the accompanying drawings.

DESCRIPTION

Figure 1:
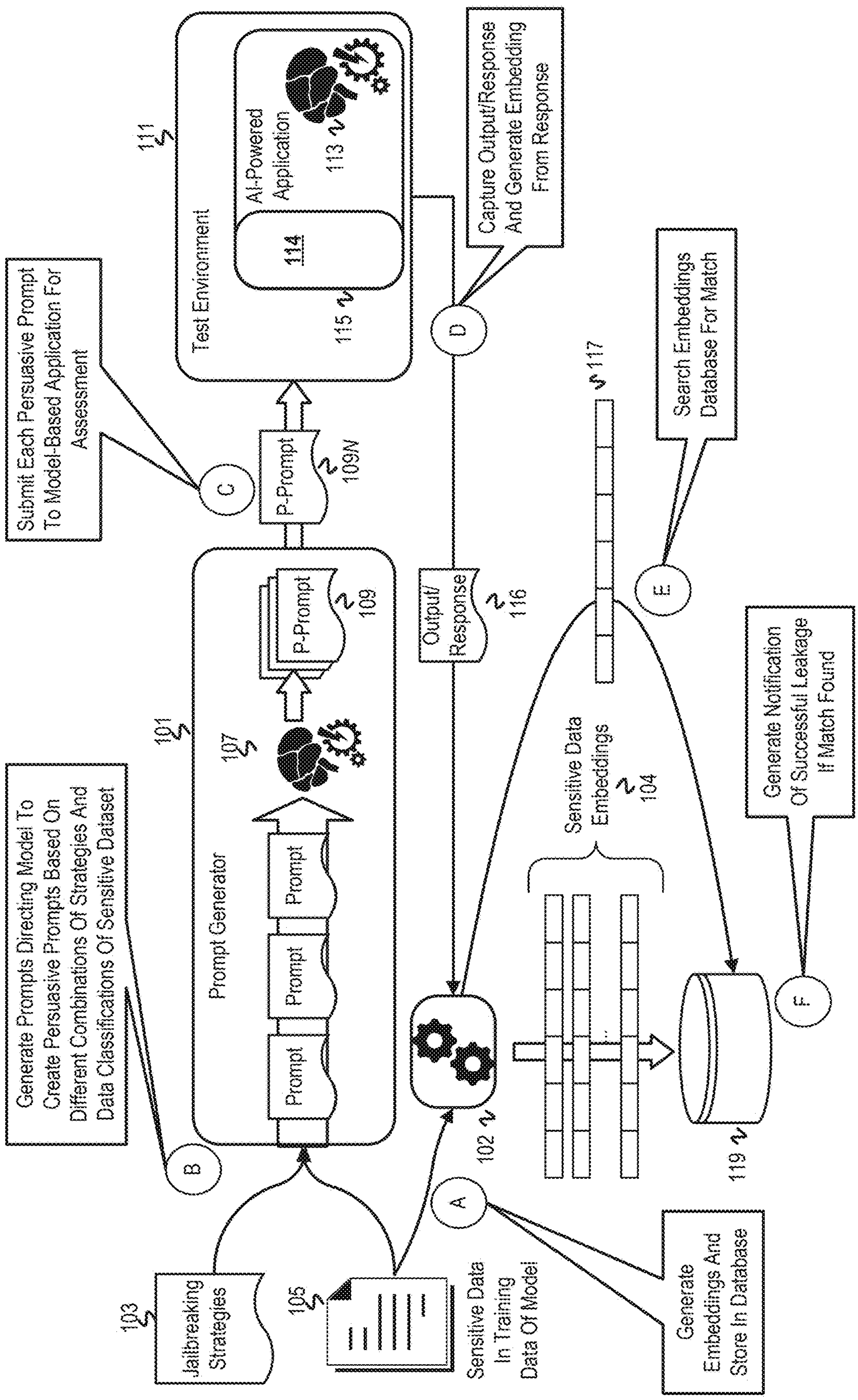
FIG. 1 is a diagram of a language model jailbreak assessment framework.

The description that follows includes example systems, methods, techniques, and program flows to aid in understanding the disclosure and not to limit claim scope. Well-known instruction instances, protocols, structures, and techniques have not been shown in detail for conciseness.

Terminology

A "prompt" refers to input to a foundation model, and prompting refers to the act of submitting a prompt to a model to perform inference based on the submitted prompt. A prompt at least includes a task for the model and one or more instructions for the task in natural language. In the case of simpler tasks, the task and the task instruction can correspond to the same natural language text. With more complex tasks, the task instruction(s) elaborates on how to achieve the tasks. A prompt can also include context, constraints, and examples. In other words, a prompt is a natural language task instruction(s) and other information that can assist the model in performing the task successfully. A prompt can have more than one task instruction, and prompts can be chained to incorporate responses from the model into a subsequent prompt. A prompt can be entered by a user and/or constructed from a prompt template.

A "technology stack" refers to a collection of technologies (e.g., libraries, tools, framework, etc.) that integrate and/or coordinate across layers to develop and/or deploy software, websites, or services. This term has commonality with the network stack with the intent to convey a visualization for understanding interaction of the collection of technologies. Generally, a technology stack or "tech" stack includes a presentation layer (e.g., front end), application layer (e.g., core logic or backend), and data layer (i.e., storage and management of data). An AI stack or language model (LM) stack will at least include a model layer as well, likely instead of a backend. An AI/LM stack may also include an orchestration layer. The orchestration layer coordinates operations and/or integrates data across components including a foundation model. In some cases, the components include multiple foundation models. Thus, the orchestration layer coordinates operations and/or requests and responses of the models. The orchestration layer can include or invoke components that construct prompts and extract information from responses to use in prompt construction and/or to combine with information from other responses.

The term "guardrails" when used in relation to language models refers to program code that implements safety and/or security protocols. One aspect of the protocols is to protect against language model vulnerabilities, including jailbreaking and prompt injection attacks. Guardrails can monitor and evaluate input to a language model and/or output from a language model. Enforcement by guardrails reduces harm by adapting an input and/or output or blocking an input and/or output.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

Overview

Assessments of guardrails of LLMs, whether used by an application or within an AI/LM stack, must be dynamic to protect against the ongoing engineering of jailbreaking prompts. An assessment framework has been created that facilitates assessment of language model guardrails. The assessment framework includes a prompt generator and has access to sensitive data (e.g., source code, trade secret, confidential documents, etc.) that occurs in training data of a model being assessed. The framework provides to the prompt generator jailbreaking strategies and categories of the sensitive data (e.g., program code, trade secret, confidential document.). With the data categories and the strategies, the prompt generator generates different prompts and submits them to the AI-powered application or LM stack being assessed. The assessment framework then analyzes the outputs/responses from the AI-powered application or LM stack to determine whether guardrails have been subverted and any of the sensitive data has been exfiltrated.

Example Illustrations

FIG. 1 is a diagram of a language model jailbreak assessment framework. The language model jailbreak assessment framework includes a prompt generator 101 and an embedding model 102. The language model jailbreak assessment framework ("framework") obtains jailbreaking strategies 103 and a dataset 105 of sensitive data. The dataset 105 includes sensitive data that is (or likely is) in training data of a model 113 that will be assessed. The language model jailbreak assessment framework also includes a vector embeddings database 119.

FIG. 1 is annotated with a series of letters A-F, each of which represents a stage of one or more operations. Although these stages are ordered for this example, the stages illustrate one example to aid in understanding this disclosure and should not be used to limit the claims. Subject matter falling within the scope of the claims can vary from what is illustrated.

At stage A, the framework generates vector embeddings 104 from the dataset 105. These embeddings will be used during model assessment to determine whether a test prompt was successful in jailbreaking the language model 113. The framework uses an embeddings model 102 to generate the vector embeddings 104. The framework updates the vector embeddings database 119 with the sensitive data vector embeddings 104.

At stage B, the framework generates prompts that direct a (first) language model 107 to create persuasive prompts based on different combinations of the jailbreaking strategies 103 and data categories in the sensitive dataset 105. The language model 107 is referred to as the first model 107 to distinguish from the language model 113 being assessed. The prompt generator 101 is depicted as including the first model 107, but implementations can instead use an external or third party language model. The prompt generator 101 uses a prompt template that has a base task and task instruction(s) for prompting the first model 107 to generate a prompt that will use a jailbreaking strategy for obtaining data of a sensitive data category. The prompt generator 101 will iterate through the jailbreaking strategies 103 and data categories of the sensitive dataset 105. Metadata of the dataset 105 or another data structure will indicate the data categories. The prompt generator 101 creates different prompts with the prompt template and different combinations of the jailbreaking strategies and data categories. The prompt generator 101 submits these prompts to the first model 107 to obtain persuasive prompts 109, identified in FIG. 1 as "P-Prompt."

At stage C, the framework submits each of the persuasive prompts 109 to an AI-powered application 115 that is using the language model 113 for assessment of the application 115. FIG. 1 depicts the application 115 as including a guardrails 114 for the language model 113. The guardrails 114 evaluate prompts to be passed to the language model 113 to filter out or modify prompts that do not satisfy the guardrails 114. The assessment is within a test environment 111 (i.e., not a production environment) to allow the framework to capture output from the application 115. The remaining stages of operation focus on submission of a persuasive prompt 109N to the application 115.

At stage D, the framework captures an output or response 115 from the application 115/language model 113 and generates a vector embedding 117. The framework captures the output/response 116 and invokes the embedding model 102 to generate the vector embedding 117 from the output/response 116.

At stage E, the framework searches the embeddings database 119 for a match with the vector embedding 117. A threshold for similarity distance will have been defined for what is considered by the framework as a match.

At stage F, the framework determines whether a match was found and generates a notification accordingly. If a match was found, then the framework was successful in subverting the guardrails 114. In that case, the framework generates a notification of that success and, optionally, indicates the data that was leaked if a mapping is maintained between embeddings and source data in the dataset 105.

Figure 2:
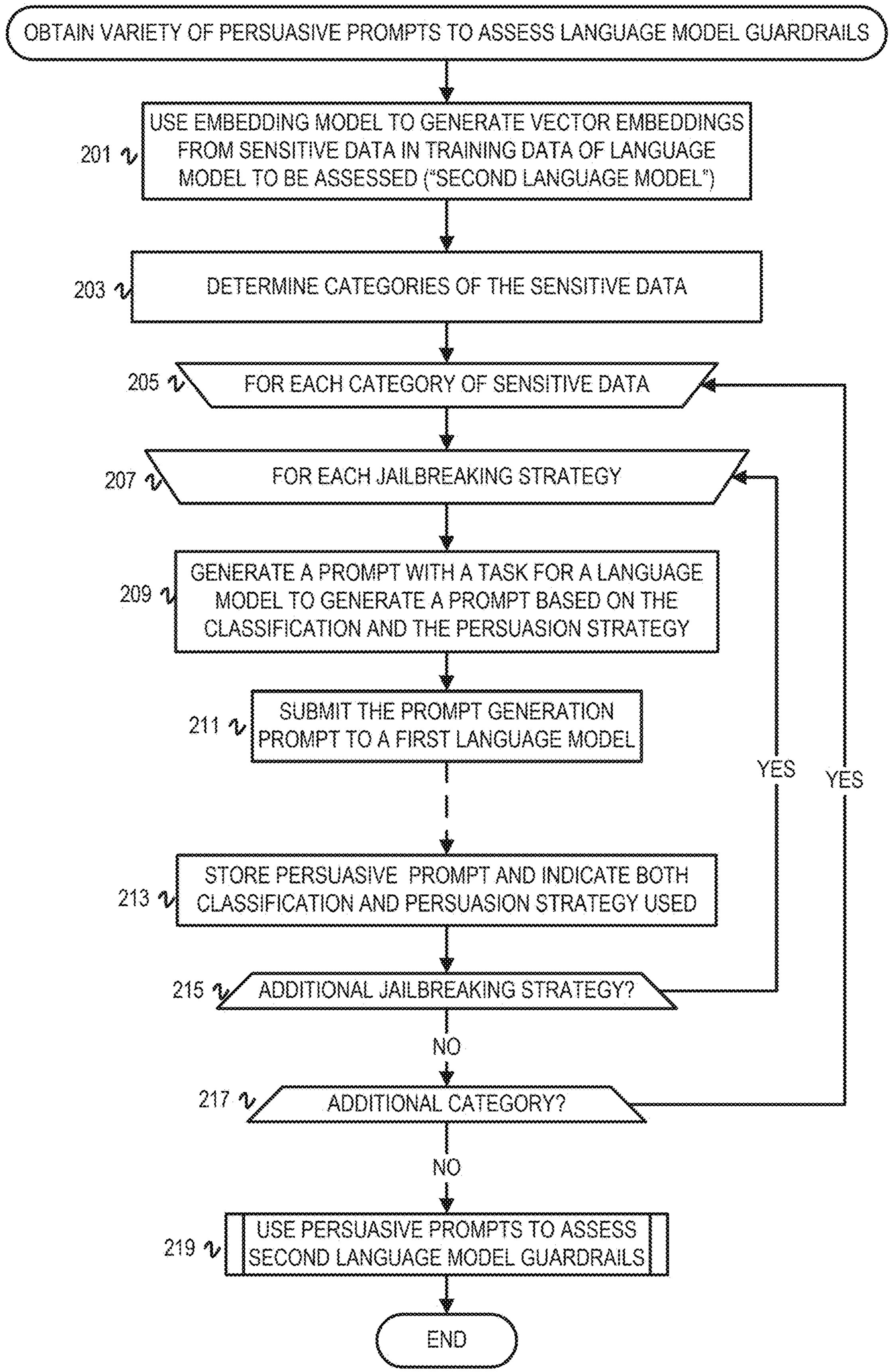
FIG. 2 is a flowchart of example operations for obtaining a variety of persuasive prompts to assess language model guardrails.
Figure 3:
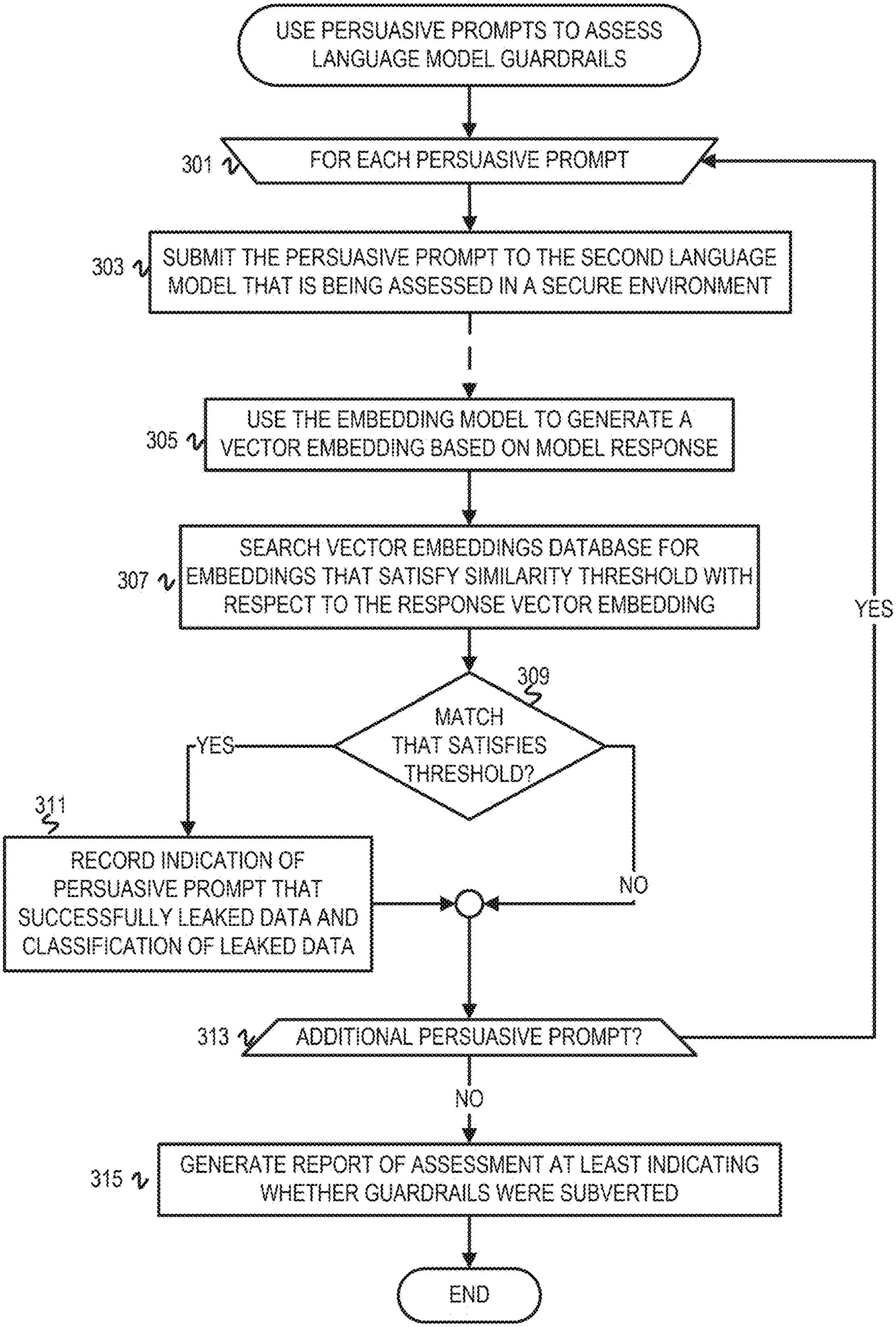
FIG. 3 is a flowchart of example operations for using persuasive prompts to assess language model guardrails.

FIGS. 2-3 are flowcharts of example operations for assessing an application that uses a language model or a language model stack to determine whether guardrails can be subverted. The example operations are described with reference to the framework for consistency with the FIG. 1 and ease of understanding. The name chosen for the program code is not to be limiting on the claims. Structure and organization of a program can vary due to platform, programmer/architect preferences, programming language, etc. In addition, names of code units (programs, modules, methods, functions, etc.) can vary for the same reasons and can be arbitrary.

FIG. 2 is a flowchart of example operations for obtaining a variety of persuasive prompts to assess language model guardrails. The guardrails are part of a LM stack or AI-powered application. As the assessment is provided by a trustworthy entity, sensitive data of a model of the LM stack or AI-powered application is provided to the operator of the assessment framework. Although the sensitive data was previously characterized as occurring in training data, this is not necessary. In some cases, sensitive data is provided to a language model by user interaction with the language model or with an application using the language model. The sensitive data can be synthetic sensitive data created through interaction with an application/language model and then provided to the framework for creating embeddings.

At block 201, the framework uses an embedding model to generate vector embeddings from sensitive data. The sensitive data is data that occurs in training data of a language model within the guardrails to be assessed ("second language model"). The framework creates or populates an embeddings database with the generated vector embeddings. In the case of a framework being used across different organizations or customers, a new embeddings database is created per customer. The framework uses the embeddings database to determine whether data has been exfiltrated.

At block 203, the framework determines categories of the sensitive data. The framework may read metadata of the sensitive data, or a separate listing of sensitive data categories provided by the owner of the AI-powered application or LM stack. Examples of sensitive data categories include program code, trade secrets, health data, and unstructured data. The assessment framework can be used for sensitive data that includes structured data, such as credit card numbers and government issued identifiers, but the example data categories present greater difficulties for existing guardrails that implement data leakage prevention strategies.

At block 205, the framework begins iterating through the data categories. The framework will combine the data category with each of the different jailbreaking strategies.

At block 207, the framework begins iterating through language model jailbreaking strategies. A file, data object, or data source can be maintained with the different language model jailbreaking strategies that have been discovered by cybersecurity experts and/or reported from cybersecurity research data sources. Examples of jailbreaking strategies include narrative or storytelling, nesting, roleplaying, developer mode, speech writing, and evidence-based persuasion.

At block 209, the framework generates a prompt with a task for a language model to generate a prompt based on the data category and the jailbreaking strategy. The framework uses a prompt template that indicates the task and a task instruction with placeholders for the jailbreaking strategy and the data category. Below is an example prompt template.

You are an assistant in quality assurance. Create */n*/ language model prompt that will obtain data of a data category */data category/* and according to a jailbreaking strategy */strategy/*.

For each combination of data category and jailbreaking strategy, the framework can replace the markers to create a prompt directing a language model to generate a prompt ("prompt generation prompt"). The above example prompt also allows for a number of prompts to be set for each combination of data category and strategy. The framework can set a temperature hyperparameter of the first language model to cause greater variety in the n language model prompts generated for each data category and strategy combination.

At block 211, the framework submits the prompt generation prompt to a first language model. The framework may pass the prompt via a front-end of a stack for the first language model or make an application programming interface (API) call with the prompt generation prompt as an argument. A dashed line from block 211 to block 213 represents the time from submission of the prompt generation prompt and receipt of a response.

At block 213, the framework receives a response from the first language model with a persuasive prompt and stores the persuasive prompt. The framework indicates both data category and jailbreaking strategy used to obtain the persuasive prompt, for example in metadata of the entry in which the persuasive prompt is stored. Embodiments may validate the responses from the first language model and limit storing of persuasive prompts to validated prompts. For instance, the framework may extract the persuasive prompt from the response and determine whether it satisfies one or more validation criteria, examples of which include variation from the already generated persuasive prompts and include a task and task instruction. As another example, the framework can apply the input component of the guardrails being assessed and discard a persuasive prompt if filtered out by the input guardrail component.

At block 215, the framework determines whether there is an additional jailbreaking strategy. If so, operational flow returns to block 207. If not, operational flow proceeds to block 217.

At block 217, the framework determines whether there is an additional data category for creating a prompt. If so, then operational flow returns to block 205. Otherwise, operational flow proceeds to block 219.

At block 219, the framework uses the stored persuasive prompts to assess guardrails of the second language model. Example operations for guardrails assessment is depicted in FIG. 3.

FIG. 3 is a flowchart of example operations for using persuasive prompts to assess language model guardrails. As previously mentioned, the assessment can be performed after the persuasive prompts are generated or begin after at least one persuasive prompt is generated and continue while additional persuasive prompts are generated. The example operations of FIG. 3 presume more than one persuasive prompt is available for assessing the language model guardrails.

At block 301, the framework begins selecting each available persuasive prompt for assessing the language model guardrails. Depending upon implementation, the framework may retrieve the persuasive prompt from a queue of available prompts that are updated by the framework with newly generated persuasive prompts.

At block 303, the framework submits the selected persuasive prompt to the second language model (i.e., the AI-powered application or LM stack) that is being assessed. Whether a LM stack or AI-powered application, the persuasive prompts will be submitted to the second language model via a front-end. The AI-power application or LM stack is hosted within a secure environment (e.g., a sandbox), such as a testing or staging environment instead of a production environment. A dashed line from block 303 to block 305 represents the time from submission of the persuasive prompt and receipt of a response.

At block 305, the framework generates a vector embedding based on the response from the second language model or output from the AI-powered application. The framework uses the embedding model that was used to build/populate the embeddings database (block 201).

At block 307, the framework searches the embeddings database for a match with the vector embedding generated based on the second language model response. For instance, the framework invokes a function or makes an API call defined for the embeddings database to search for a match. The arguments can be the vector embedding and a threshold for similarity.

At block 309, the framework determines whether the embeddings database returns an indication of a match that satisfies the similarity threshold. If no match satisfied the similarity threshold, then the embeddings database can return a null value or an explicit no match response. Otherwise, the embeddings database can return the matching sensitive data embedding. If a match was found, then operational flow proceeds to block 311. Otherwise, operational flow proceeds to block 313.

At block 311, the framework records an indication of the persuasive prompt that subverted the guardrails. The framework also records the metadata or descriptors of the persuasive prompt (i.e., the data category and strategy used to create the persuasive prompt). If mappings are maintained between the sensitive data and sensitive data embeddings, the framework can also record the sensitive data that was leaked. If multiple sensitive data embeddings matched the vector embedding of the second language model response, then implementations can record all of the matching embeddings or the matching embeddings with the greatest similarity.

At block 313, the framework determines whether there is another persuasive prompt available for assessing the language model guardrails. If so, then operational flow returns to block 301. Otherwise, operational flow proceeds to block 315. However, embodiments that concurrently generate persuasive prompts and assess the language model guardrails may implement a notification mechanism between the processes. For instance, an additional operation after block 313 may be to determine whether persuasive prompt generation has completed and not proceed to block 315 until notified that both no persuasive prompts are available and persuasive prompt generation has completed.

At block 315, the framework generates a report of the assessment that at least indicates whether the guardrails were subverted. The framework can generate the report to list out the persuasive prompts and corresponding descriptors that were successful in subverting the guardrails. The information can be used to adjust the guardrails or insert other security measures.

Variations

The examples illustrated in FIG. 1 and FIG. 2 presume accumulation of persuasive prompts before assessment. Implementations are not so limited. For instance, implementations can submit each persuasive prompt as generated or at an interval between each prompt being generated and all prompts being generated, such as after persuasive prompts for a data category are generated.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the looping to create data category and jailbreaking strategy combinations can be reversed. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electro-magnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 4:
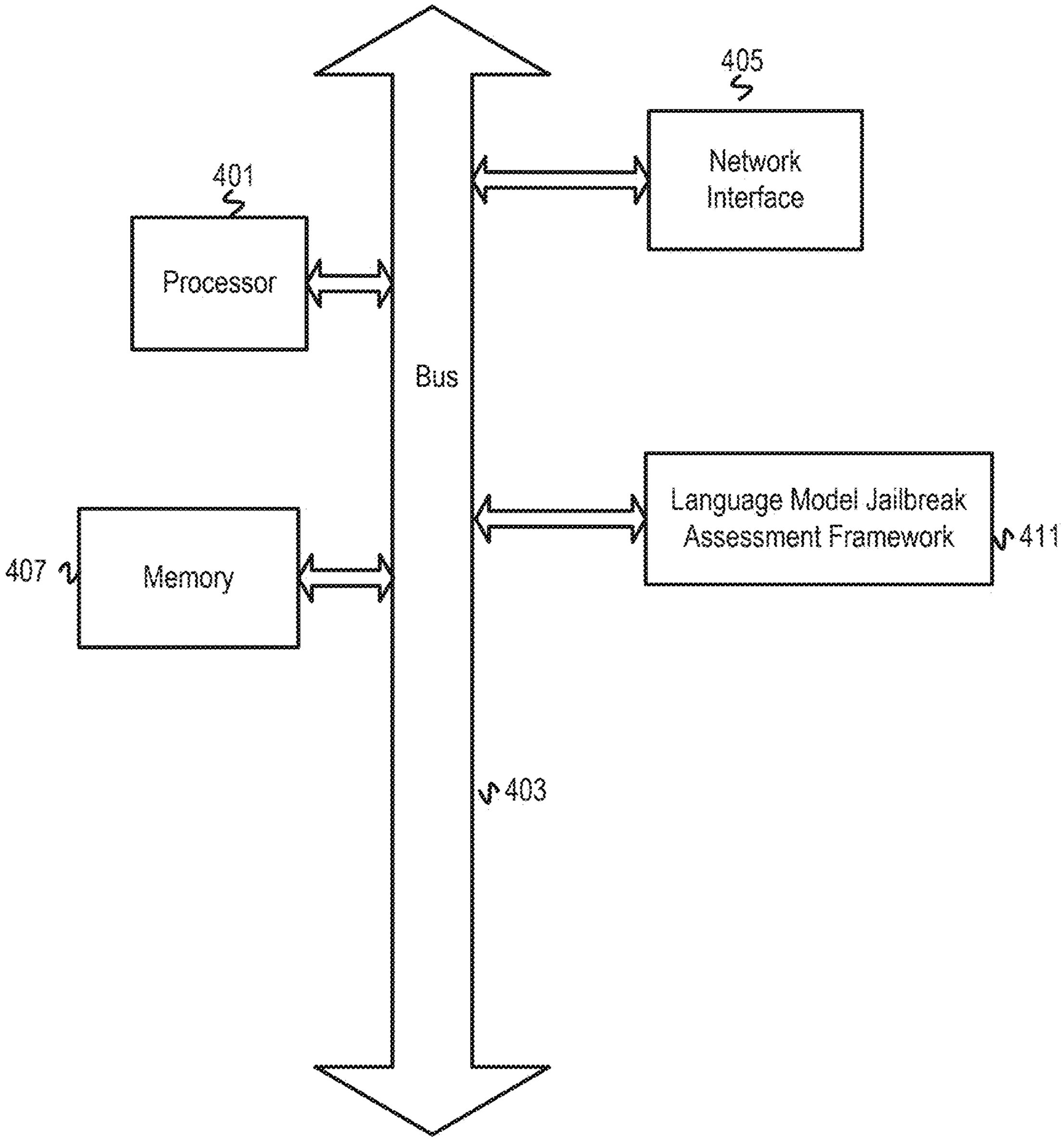
FIG. 4 depicts an example computer system with a language model jailbreak assessment framework.

FIG. 4 depicts an example computer system with a language model jailbreak assessment framework. The computer system includes a processor 401 (possibly including multiple processors, multiple cores, multiple nodes, and/or implementing multi-threading, etc.). The computer system includes memory 407. The memory 407 may be system memory or any one or more of the above already described possible realizations of machine-readable media. The computer system also includes a bus 403 and a network interface 405. The system also includes a language model jailbreak assessment framework 411. The language model jailbreak assessment framework 411 includes a prompt generator and a semantic-based leakage detector to assess language model guardrails. The prompt generator prompts a language model (not the language model corresponding to the assessment) to generate prompts to persuade a language model (the language model for which guardrails are being assessed) to recall sensitive data of a specified data category according to different jailbreaking strategies. The semantic-based leakage detector determines similarity of the semantic embeddings previously generated for sensitive data of the language model being persuaded with respect to a semantic embeddings of a response or output from the language model being persuaded. The language model jailbreak assessment framework 411 can provide a listing of the prompts that were successful in subverting the language model guardrails to facilitate improvement of the guardrails. Any one of the previously described functionalities may be partially (or entirely) implemented in hardware and/or on the processor 401. For example, the functionality may be implemented with an application specific integrated circuit, in logic implemented in the processor 401, in a co-processor on a peripheral device or card, etc. Further, realizations may include fewer or additional components not illustrated in FIG. 4 (e.g., video cards, audio cards, additional network interfaces, peripheral devices, etc.). The processor unit 401 and the network interface 405 are coupled to the bus 403. Although illustrated as being coupled to the bus 403, the memory 407 may be coupled to the processor 401.

The invention claimed is:

1. A method comprising:

for each of a plurality of jailbreaking strategies, prompting a first language model to generate a set of one or more jailbreak prompts to leak sensitive data based on the jailbreaking strategy and a first category of sensitive data; and evaluating guardrails of a second language model with the set of one or more jailbreak prompts, wherein evaluating the guardrails comprises, for each of the set of jailbreak prompts, submit the jailbreak prompt to the second language model via a front-end for the second language model;

determine whether output of the second language model is semantically similar to sensitive data to an extent that satisfies a semantic similarity threshold; and indicating that the guardrails were subverted if the semantic similarity threshold is satisfied.

2. The method of claim 1 further comprising generating a plurality of semantic embeddings from the sensitive data, wherein determining whether the output is semantically similar to the sensitive data comprises generating a semantic embedding from the output and comparing the output semantic embedding against the plurality of semantic embeddings.

3. The method of claim 1, wherein prompting the first language model to generate jailbreak prompts comprises prompting the first language model to generate n different jailbreak prompts for each jailbreaking strategy.

4. The method of claim 1, wherein prompting the first language model to generate jailbreak prompts for each of the plurality of jailbreaking strategies comprises prompting the first language model to generate one or more jailbreak prompts for each jailbreaking strategy and for each of a plurality of different categories of sensitive data which includes the first category of sensitive data.

5. The method of claim 1 further comprising setting a temperature hyperparameter of the first language model to increase variety in jailbreak prompts generated by the first language model.

6. The method of claim 1, wherein training data of the second language model comprises the sensitive data.

7. The method of claim 1 further comprising tracking which of the jailbreak prompts successfully persuade the second language model to leak sensitive data.

8. The method of claim 1, wherein the sensitive data is one of program code, a sensitive document, and a trade secret.

9. The method of claim 1, wherein the plurality of jailbreaking strategies comprises at least two of nesting, storytelling, evidence-based persuasion, and speech writing.

10. A non-transitory, machine-readable medium having program code stored thereon, the program code comprising instructions to:

prompt a first language model to generate prompts based on a plurality of jailbreaking strategies and a set of one or more categories of sensitive data; and determine whether one or more of the generated prompts subverts guardrails of a second language model to leak sensitive data, wherein the instructions to determine whether one or more of the generated prompts subverts the guardrails comprise instructions to, submit each of the generated prompts to a front-end of the second language model; and for each output from the second language model, determine whether the corresponding one of the generated prompts successfully caused data leakage based on semantic similarity of the output and the sensitive data and indicate whether the corresponding prompt was successful.

11. The non-transitory, machine-readable medium of claim 10, wherein the program code further comprises instructions to generate a plurality of semantic embeddings from the sensitive data, wherein the instructions to determine for each output whether the corresponding one of the generated prompts successfully caused data leakage based on semantic similarity comprise instructions to generate a semantic embedding from the output and determine semantic similarity between the output semantic embedding and each of the plurality of semantic embeddings.

12. The non-transitory, machine-readable medium of claim 10, wherein the instructions to prompt the first language model to generate prompts comprise instructions to prompt the first language model to generate n different prompts for each jailbreaking strategy.

13. The non-transitory, machine-readable medium of claim 10, wherein the instructions to prompt the first language model to generate prompts comprise instructions to prompt the first language model to generate one or more prompts for each jailbreaking strategy and for each of the set of categories of sensitive data.

14. The non-transitory, machine-readable medium of claim 10, wherein training data of the second language model comprises the sensitive data.

15. The non-transitory, machine-readable medium of claim 10, wherein the program code further comprises instructions to track which of the generated prompts successfully subverted the guardrails.

16. An apparatus comprising:

a processor; and a machine-readable medium having stored thereon instructions executable by the processor to cause the apparatus to, prompt a first language model to generate prompts based on a plurality of jailbreaking strategies and a set of one or more categories of sensitive data; and determine whether one or more of the generated prompts causes a second language model to leak sensitive data, wherein the instructions to determine whether one or more of the generated prompts causes the second language model to leak sensitive data comprise instructions to, submit each of the generated prompts to a front-end of the second language model; and for each output from the second language model, determine whether the corresponding one of the generated prompts successfully caused data leakage based on semantic similarity of the output and the sensitive data and indicate whether the corresponding prompt was successful.

17. The apparatus of claim 16, wherein the machine-readable medium further has stored thereon instructions executable by the processor to cause the apparatus to generate a plurality of semantic embeddings from the sensitive data, wherein the instructions to determine for each output whether the corresponding one of the generated prompts successfully caused data leakage based on semantic similarity comprise the instructions being executable by the processor to cause the apparatus to generate a semantic embedding from the output and determine semantic similarity between the output semantic embedding and each of the plurality of semantic embeddings.

18. The apparatus of claim 16, wherein the instructions to prompt the first language model to generate prompts comprise the instructions being executable by the processor to cause the apparatus to prompt the first language model to generate n different prompts for each jailbreaking strategy.

19. The apparatus of claim 16, wherein the instructions to prompt the first language model to generate prompts comprise the instructions being executable by the processor to cause the apparatus to prompt the first language model to generate one or more jailbreak prompts for each jailbreaking strategy and for each of the set of categories of sensitive data.

20. The apparatus of claim 16, wherein training data of the second language model comprises the sensitive data.

* * * * *